NO. 31 RX31

8741X RELATED DOC.

UNITED STATES PATENT OFFICE.

ELIAS HOWE, OF CAMBRIDGEPORT, MASS., ASSIGNEE OF JOSEPH C. SMITH.

IMPROVEMENT IN THE APPLICATION OF A MATERIAL CALLED PALM-LEAF OR BRUB GRASS TO THE STUFFING OF BEDS, MATTRESSES, SOFAS, CUSHIONS, AND ALL OTHER USES FOR WHICH HAIR, FEATHERS, MOSS, OR OTHER SOFT AND ELASTIC SUBSTANCES ARE USED.

Specification forming part of Letters Patent dated April 3, 1835; Reissue dated March 18, 1841.

*To all whom it may concern:*

Be it known that JOSEPH C. SMITH, of Cambridgeport, in the county of Middlesex and Commonwealth of Massachusetts, hath invented a new and useful manufacture which is denominated "Curled Palm-Leaf or Brub Grass," which may be used for the Stuffing of Beds, Mattresses, Sofas, Cushions, and for all other Purposes for which Hair, Feathers, Moss, or other Soft and Elastic Substances are Used, forming a very cheap substitute, of which the following is a specification.

To enable others skilled in the art to which this appertains to make and use the invention, I shall now proceed to describe the method of preparing or manufacturing the same.

The first operation is to reduce the palm-leaf or brub grass to filaments or fibers sufficiently fine to be spun, which filaments or fibers I then spin and form into a rope, which should be twisted as hard as possible, so as to kink or cause the rope to form in balls or coils. This spinning and twisting should be done upon machines similar to those used for spinning and twisting hemp. After the aforesaid process of twisting is completed, the coils, balls, or twisted hanks should be placed in a steam or any other kind of oven, where they should be baked to such a degree as to permanently fix the curl or twist in the fibers or filaments. When this effect is properly produced, the coils should be untwisted, which operation may be effected by a reverse motion of the same machinery by which it is twisted. After passing through these several preparative processes, the fibers of palm-leaf or brub grass are left in a light and durably elastic and curly state, and are suitable for stuffing any of the various articles hereinabove enumerated.

I shall claim as the invention—

The process of preparing or durably curling palm-leaf or brub grass by reducing the leaf to small filaments or fibers, and likewise spinning, baking or steaming, and untwisting the same, the whole operation being substantially as hereinabove described, and for the purposes above specified.

ELIAS HOWE.

Witnesses:
R. H. EDDY,
EZRA LINCOLN, Jr.